(12) United States Patent
Kang et al.

(10) Patent No.: US 12,730,243 B2
(45) Date of Patent: Sep. 8, 2026

(54) APPARENT RESISTIVITY MEASURING SYSTEM AND METHOD USING SEMI-AIRBORNE ELECTROMAGNETIC METHOD

(71) Applicant: Institute of Geology and Geophysics, Chinese Academy of Sciences, Beijing (CN)

(72) Inventors: Lili Kang, Beijing (CN); Zhongxing Wang, Beijing (CN); Zhiyao Liu, Beijing (CN); Tianxin Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 250 days.

(21) Appl. No.: 18/419,248

(22) Filed: Jan. 22, 2024

(65) Prior Publication Data

US 2024/0295670 A1 Sep. 5, 2024

Related U.S. Application Data

(63) Continuation of application No. PCT/CN2023/086174, filed on Apr. 4, 2023.

(30) Foreign Application Priority Data

Mar. 3, 2023 (CN) ......................... 202310200155.9

(51) Int. Cl.

*G01V 3/08* (2006.01)
*G01V 3/10* (2006.01)
*G01V 3/38* (2006.01)

(52) U.S. Cl.

CPC ............. *G01V 3/088* (2013.01); *G01V 3/104* (2013.01); *G01V 3/38* (2013.01)

(58) Field of Classification Search

CPC ........... G01V 3/088; G01V 3/104; G01V 3/38

(Continued)

(56) References Cited

U.S. PATENT DOCUMENTS 3,943,436 A * 3/1976 Pirson .................... G01V 3/082 324/345
4,210,869 A * 7/1980 Groenendyke ........ G01V 3/082 324/350

(Continued)

FOREIGN PATENT DOCUMENTS

CN 1632617 A 6/2005
CN 105301663 A 2/2016

(Continued)

OTHER PUBLICATIONS

Wojniak, Wayne Stanley. “A magnetotelluric sounding at the Tucson magnetic and seismological observatory.” (1979). (Year: 1979).*

(Continued)

*Primary Examiner* — Christopher P McAndrew

(57) ABSTRACT

Disclosed in the present disclosure are an apparent resistivity measuring system and method using a semi-airborne electromagnetic method. The system includes: a magnetic field sensor for acquiring magnetic field response data; an electric field sensor for acquiring electric field response data; and a processor, where the magnetic field sensor and the electric field sensor each are connected to the processor, and the processor is configured to perform calculation to obtain tippers according to the magnetic field response data, perform calculation to obtain impedance, Cagniard apparent resistivity and fitted apparent resistivity according to the magnetic field response data and the electric field response data, and perform inversion according to one or more kinds (Continued)

of data of the tippers, the fitted apparent resistivity, the impedance and the Cagniard apparent resistivity to obtain underground resistivity.

11 Claims, 7 Drawing Sheets

(58) Field of Classification Search
USPC .......................................................... 324/323
See application file for complete search history.

(56) References Cited

U.S. PATENT DOCUMENTS

| | | | |
|---|---|---|---|
| 2014/0312905 A1 | 10/2014 | Wheelock | |
| 2019/0196046 A1* | 6/2019 | Di | G01V 3/12 |
| 2023/0341579 A1* | 10/2023 | Cao | G01V 3/083 |

FOREIGN PATENT DOCUMENTS

| | | | | |
|---|---|---|---|---|
| CN | 108169800 A | * | 6/2018 | G01V 3/083 |
| CN | 109917466 A | | 6/2019 | |
| CN | 110471117 A | | 11/2019 | |
| CN | 112068212 A | | 12/2020 | |
| CN | 112946762 A | | 6/2021 | |
| CN | 113625347 A | | 11/2021 | |
| CN | 114114429 A | | 3/2022 | |
| CN | 115201922 A | | 10/2022 | |

OTHER PUBLICATIONS

Zhang, Jifeng, Rihua Huang, and Bing Feng. "A synthetic aperture for land controlled-source electromagnetic surveys." Journal of Applied Geophysics 174 (2020): 103945. (Year: 2020).*
International Search Report of PCT/CN2023/086174.

* cited by examiner

APPARENT RESISTIVITY MEASURING SYSTEM AND METHOD USING SEMI-AIRBORNE ELECTROMAGNETIC METHOD

CROSS-REFERENCE TO RELATED APPLICATION

This Application is a bypass continuation application of PCT/CN2023/086174. This application claims priorities from PCT Application No. PCT/CN2023/086174, filed Apr. 4, 2023, and from the Chinese patent application 2023102001559 filed Mar. 3, 2023, the content of which is incorporated herein in the entirety by reference:

TECHNICAL FIELD

The present disclosure belongs to the technical field of airborne electromagnetic method measurement, and particularly relates to an apparent resistivity measuring system and method using a semi-airborne electromagnetic method.

BACKGROUND

A ground transmitting-air receiving mode is employed in a semi-airborne electromagnetic detection method, which has the advantages of strong adaptability to complex terrain and high detection efficiency compared with a traditional ground transmitting-ground receiving mode, and has achieved good application results in exploration of mineral resources, groundwater exploration and engineering geological exploration in complex terrain areas. In existing electromagnetic detection methods and systems in the semi-airborne frequency domain, the manner of measuring single magnetic fields or magnetic field tippers is mainly employed to calculate underground resistivity by means of inversion. Since a signal of a vertical magnetic field component which is most sensing to ground among the three components responding to a magnetic field is weak and decays rapidly with an increase of a transmitter-to-receiver distance, a signal-to-noise ratio of a system is low, and it is difficult to realize large-depth and wide-range detection. Moreover, a semi-airborne electromagnetic detection method based on a single magnetic field component needs auxiliary measurement of transmitting field source information, and arrangement accuracy of a transmitting source and unknown grounding conditions will introduce a systematic error and affect observation accuracy.

SUMMARY

(I) Purpose of Present Disclosure

An objective of the present disclosure is to provide an apparent resistivity measuring system and method using a semi-airborne electromagnetic method so as to solve the above problems.

(II) Technical Solutions

In order to solve the above problems, in a first aspect, the present disclosure provides an apparent resistivity measuring system using a semi-airborne electromagnetic method. The system includes a magnetic field sensor for acquiring magnetic field response data; an electric field sensor for acquiring electric field response data; and a processor, where the magnetic field sensor and the electric field sensor each are connected to the processor, and the processor is configured to perform calculation to obtain tippers according to the magnetic field response data, perform calculation to obtain impedance, Cagniard apparent resistivity and fitted apparent resistivity according to the magnetic field response data and the electric field response data, and perform inversion according to one or more kinds of data of the tippers, the fitted apparent resistivity, the impedance and the Cagniard apparent resistivity to obtain underground resistivity.

Furthermore, the electric field sensor includes: a sensing unit including two capacitance modules symmetrically distributed and having the same size, where capacitance is calculated by measuring voltages of the two capacitance modules, and the electric field response data is calculated and obtained by means of the capacitance; and a readout unit including an integration module and an amplifier, where the integration module is configured to condition a frequency response curve of the electric field sensor into a flat straight line.

Furthermore, the electric field sensor includes: a gyroscope for detecting an attitude deflection angle of the electric field sensor.

Furthermore, the electric field sensor is arranged outside an annulus of a receiving coil.

Furthermore, the magnetic field response data is three-component magnetic field response data, and the electric field response data is two-component electric field response data.

Furthermore, the processor calculates fitted apparent resistivity on the basis of the horizontal electric field response data of a single x direction and the magnetic field response data of a single vertical component. The processor calculates impedance and Cagniard apparent resistivity in x and y directions on the basis of the electric field response data in a horizontal direction and the magnetic field response data in the horizontal direction, and the processor calculates tippers on the basis of the magnetic field response data utilizing three components.

Furthermore, the electric field sensor is a spherical capacitive electric field sensor or a box type capacitive electric field sensor.

In another aspect, the present disclosure provides an apparent resistivity measuring method using a semi-airborne electromagnetic method, where measurement is performed by using the measuring system according to any one of the above technical solutions.

Furthermore, the method includes: acquiring magnetic field response data; acquiring electric field response data; and performing calculation to obtain tippers according to the magnetic field response data, performing calculation to obtain impedance, Cagniard apparent resistivity and fitted apparent resistivity according to the magnetic field response data and the electric field response data, and performing inversion according to one or more kinds of data of the tippers, the fitted apparent resistivity, the impedance and the Cagniard apparent resistivity to obtain underground resistivity.

Furthermore, the method includes: acquiring the three-component magnetic field response data; acquiring the two-component electric field response data; calculating fitted apparent resistivity on the basis of horizontal electric field response data of a single x direction and magnetic field response data of a single vertical component; calculating impedance and Cagniard apparent resistivity in both x and y directions on the basis of the electric field response data in a horizontal direction and the magnetic field response data in the horizontal direction; calculating tippers on the basis of the magnetic field response data utilizing three components; and performing inversion according to one or more kinds of data of the tippers, the fitted apparent resistivity, the impedance and the Cagniard apparent resistivity to obtain underground resistivity.

III. Beneficial Effects

The above technical solutions of the present disclosure have the following beneficial technical effects:

According to the apparent resistivity measuring system using a semi-airborne electromagnetic method, an electric field is introduced, influence of a transmitting field source is eliminated by means of a ratio of an electromagnetic field, and interpretation accuracy is improved. Systemically, a signal-to-noise ratio of the system is improved by measuring electric field and magnetic field signals in the horizontal direction which are stronger in signal and slow in attenuation along with a transmitter-to-receiver distance, and a detection range and a detection depth can be effectively expanded and increased respectively.

- 1: z-direction magnetic field response measuring coil; 2: x-direction magnetic field response measuring coil; 3: y-direction magnetic field response measuring coil; 4: measuring coil fixed support; 5: three-component electric field response sensor; and 6: three-component electric field sensor support.

Figure 10:
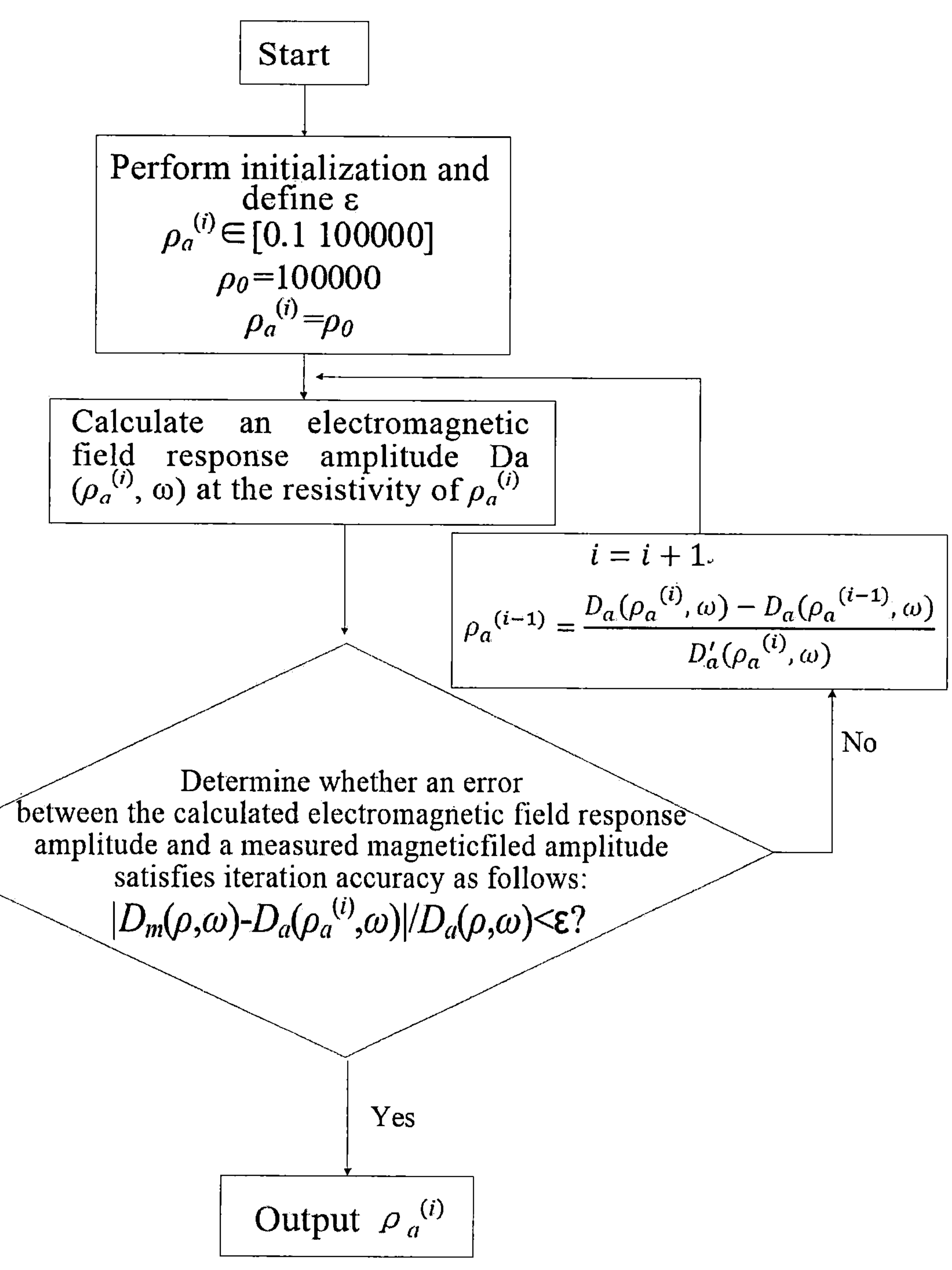

FIG. 10 is a flow chart of iterative calculation for field fitted apparent resistivity.

DETAILED DESCRIPTION OF THE EMBODIMENTS

For making the objectives, technical solutions and advantages of the present disclosure clearer, the present disclosure will be described in further detail below in conjunction with the specific embodiments with reference to the accompanying drawings. It should be under stood these descriptions are exemplary only and are not intended to limit the scope of the present disclosure. In addition, in the following specification, the description of the known structure and technique is omitted to avoid unnecessary confusion of the concept of the present disclosure.

Schematic diagrams of layer structures according the examples of the present disclosure are shown in the accompanying drawings. These drawings are not drawn to scale, with certain details magnified and possibly omitted for clarity. The shapes of various regions and layers shown in the drawings and the relative sizes and positional relationships between them are only exemplary, and may deviate due to manufacturing tolerances or technical limitations in practice, and those skilled in the art may additionally design regions/layers having different shapes, sizes and relative positions according to actual needs.

Apparently, the examples described are merely some examples of the present disclosure rather than all examples of the present disclosure. All the other examples obtained by those of ordinary skill in the art based on the examples in the present disclosure without creative efforts shall fall within the scope of protection of the present disclosure.

Further, the technical features involved in different implementations of the present disclosure described below may be combined with one another as long as they do not constitute a conflict with one another.

The present disclosure will be described in more detail below with reference to the accompanying drawings. In the various accompanying drawings, the same elements are designated by the similar reference numerals. For clarity, various parts of the accompanying drawings are not drawn to scale.

In an example of the present disclosure, an apparent resistivity measuring system using a semi-airborne electromagnetic method is provided and may include: a magnetic field sensor for acquiring magnetic field response data; an electric field sensor for acquiring electric field response data; and a processor, where the magnetic field sensor and the electric field sensor each are connected to the processor, and the processor is configured to perform calculation to obtain tippers according to the magnetic field response data, perform calculation to obtain impedance, Cagniard apparent resistivity and fitted apparent resistivity according to the magnetic field response data and the electric field response data, and perform inversion according to one or more kinds of data of the tippers, the fitted apparent resistivity, the impedance and the Cagniard apparent resistivity to obtain underground resistivity.

According to the apparent resistivity measuring system using a semi-airborne electromagnetic method, an electric field is introduced, influence of a transmitting field source is eliminated by means of a ratio of an electromagnetic field, and interpretation accuracy is improved. Systemically, a signal-to-noise ratio of the system is improved by measuring electric field and magnetic field signals in the horizontal direction which are stronger and slow in attenuation along with a transmitter-to-receiver distance, such that a detection range can be effectively expanded, and a detection depth can be effectively increased.

In an optional example, the electric field sensor may be a three-component electric field response sensor. In an optional example, the magnetic field sensor may be a three-component magnetic field response measuring coil.

Figure 1:
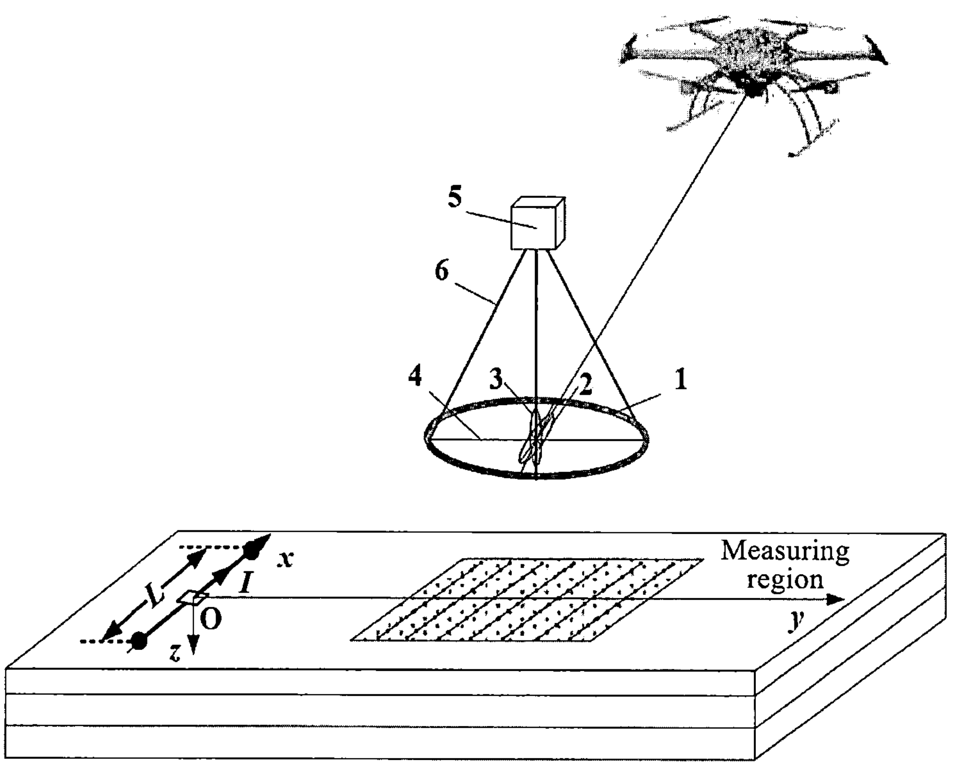
FIG. 1 is a schematic diagram of an apparent resistivity measuring system using a semi-airborne electromagnetic method according to one embodiment of the present disclosure.

FIG. 1 is a schematic diagram of the apparent resistivity measuring system using a semi-airborne electromagnetic method according to one embodiment of the present disclosure.

As shown in FIG. 1, the system is composed of two portions, namely a ground transmitting system and an air receiving system, where the air receiving system is composed of a three-component magnetic field response measuring coil, a three-component electric field response sensor, a receiver and a fixed support.

The three-component magnetic field response measuring coil is composed of a z-direction magnetic field response measuring coil, an x-direction magnetic field response measuring coil and a y-direction magnetic field response measuring coil, where the three coils are concentrically and orthogonally distributed, are connected and fixed at the center point position of the measuring coil by means of the fixed support, and the center point is suspended below a rotorcraft by means of a rope. The three-component electric field response sensor is fixed directly above the z-direction magnetic field measuring coil by means of a conical support. The receiver is suspended on the rope and is away from the rotorcraft and the electric and magnetic field sensors by a certain distance so as to mitigate interference coupling therebetween.

When a receiving coil is in a completely horizontal state, according to a transmitting source on the ground, the center of the measuring coil is taken as an origin, the direction perpendicular to the plane where the receiving coil is located and vertically pointing to the ground is a z direction, the transmitting direction perpendicular to the z direction and parallel to the transmitting source is an x direction, and the direction perpendicular to the z direction and the x direction and facing the receiving coil is a y direction.

The present disclosure mainly focuses on an x-direction electric field $E_x$, a y-direction magnetic field $B_y$ and a z-direction magnetic field $B_z$ which are sensitive to underground target layers, a ground transmitting source with a transmitting current of I and a length of L, a transmitting frequency is f, the corresponding angular frequency is ω, and a response formula at any position (x,y,z) in the air is as follows:

$$E_x = \frac{1}{\hat{y}}\frac{\partial^2 A_z}{\partial x \partial z} = \frac{\partial F_z}{\partial y} \tag{1}$$

$$= -\frac{IL}{4\pi}\frac{\partial}{\partial x}\frac{x}{\rho}\int_0^\infty \left[ \begin{array}{c} \left(e^{u_0(z+h)} - r_{TM}e^{u_0(z-h)}\right)\frac{\hat{z}_0}{u_0} - \\ \left(e^{u_0(z+h)} + r_{TE}e^{u_0(z-h)}\right)\frac{u_0}{\hat{y}_0} \end{array} \right] J_1(\lambda) -$$

$$\frac{\hat{z}_0 IL}{4\pi}\int_0^\infty \left(e^{u_0(z+h)} + r_{TE}e^{u_0(z-h)}\right)\frac{\lambda}{u_0}J_0(\lambda)$$

$$B_y = \mu_0\left(-\frac{\partial A_z}{\partial x} + \frac{1}{\hat{z}}\frac{\partial^2 F_c}{\partial y \partial z}\right) \tag{2}$$

$$= \frac{\mu_0 Idl}{4\pi}\frac{x^2}{r^2}\int_0^\infty (r_{TM} - r_{TE})\cdot e^{u_0(z-k)}\lambda J_0(\lambda r)d\lambda +$$

$$\frac{\mu_0 Idl}{4\pi}\int_0^\infty \left[e^{u_0(z+h)} + r_{TE}\cdot e^{u_0(z-h)}\right]\lambda J_0(\lambda r)d\lambda +$$

$$\frac{\mu_0 Idl}{4\pi}\cdot\frac{x^2 - y^2}{r^3}\cdot\int_0^\infty (r_{TE} - r_{TM})\cdot e^{u_0(z-h)}J_1(\lambda r)d\lambda$$

$$B_z = \frac{\mu_0}{\hat{z}}\left(\frac{\partial^2}{\partial z^2} + k^2\right)F_z \tag{3}$$

-continued $$= \frac{\mu_0 Idl}{4\pi}\int_0^\infty \left[e^{u_0(z+h)} + r_{TE}e^{u_0(z-h)}\right]\frac{\lambda^2}{u_0}J_1(\lambda r)d\lambda$$

$\mu_0$ is permeability in vacuum, $r_{TE}$ and $r_{TM}$ are reflection coefficients, which can be obtained by means of a general calculation formula.

The field fitted apparent resistivity is calculated by using an iterative method, and the calculation flow is shown in FIG. 10.

Formula (4) for calculating Cagniard apparent resistivity is:

$$\rho_a = \frac{0.2}{f}\left(\frac{|E_x|}{|B_y|}\right)^2 \tag{4}$$

Formula (5) for calculating tippers is:

$$T_{zy} = \frac{|B_z|}{|B_y|} \tag{5}$$

A three-layer earth resistivity model with background resistivity of 1000 Ω·m, a buried depth of 500 m, a thickness of 100 m and resistivity of 10 Ω·m is taken as an example, responses of an electric field and a magnetic field are analyzed, and field fitted apparent resistivity $p_a^{(i)}$, Cagniard apparent resistivity and tipper distribution are compared.

$$\rho_a^{(i)} = \rho_a^{(i-1)} + \frac{D_a(\rho_a^{(i)}, \omega) - D_a(\rho_a^{(i-1)}, \omega)}{D'_a(\rho_a^{(i)}, \omega)}$$

In an optional example, the magnetic field response data and the electric field response data are acquired at the same moment.

Figure 2:
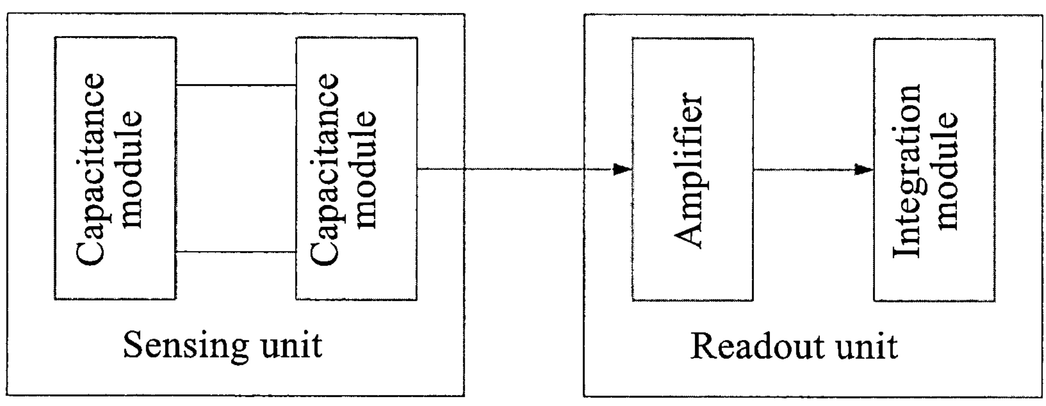
FIG. 2 is a schematic diagram of an electric field sensor according to one embodiment of the present disclosure.

FIG. 2 is a schematic diagram of an electric field sensor according to one embodiment of the present disclosure.

As shown in FIG. 2, in an optional example, the electric field sensor may include: a sensing unit including two capacitance modules symmetrically distributed and having the same size, where capacitance is calculated by measuring voltages of the two capacitance modules, and the electric field response data is calculated and obtained by means of the capacitance.

In an optional example, the electric field sensor may further include a readout unit including an integration module and an amplifier, where the integration module is configured to condition a frequency response curve of the electric field sensor into a flat straight line.

In an optional example, the amplifier may be a differential amplifier.

In an optional example, the integration module may be an integrator.

In an optional example, the electric field sensor may further include: a gyroscope for detecting an attitude deflection angle of the electric field sensor.

In an optional example, the electric field sensor is arranged outside an annulus of the receiving coil.

In an optional example, the magnetic field response data is three-component magnetic field response data.

In an optional example, the electric field sensor is two-component electric field response data.

In an optional example, the processor calculates fitted apparent resistivity on the basis of the horizontal electric field response data of the single x direction and the magnetic field response data of a single vertical component.

In an optional example, the processor calculates impedance and Cagniard apparent resistivity in x and y directions on the basis of the electric field response data in a horizontal direction and the magnetic field response data in the horizontal direction.

In an optional example, the processor calculates tippers on the basis of the magnetic field response data utilizing three components.

In an optional example, the electric field sensor is a spherical capacitive electric field sensor.

In an optional example, the electric field sensor is a box type capacitive electric field sensor.

FIGS. 3-6 show spectral responses of the electric field sensor and discrete components thereof.

Figure 3:
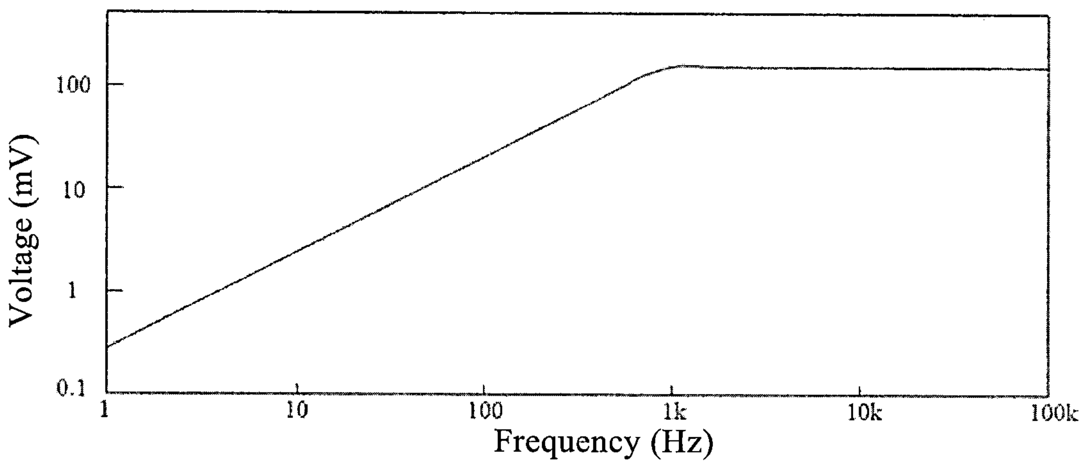
FIG. 3 is a response spectrum curve of a sensing unit according to one embodiment of the present disclosure.

FIG. 3 is a response spectrum curve of the sensing unit according to one embodiment of the present disclosure.

Figure 4:
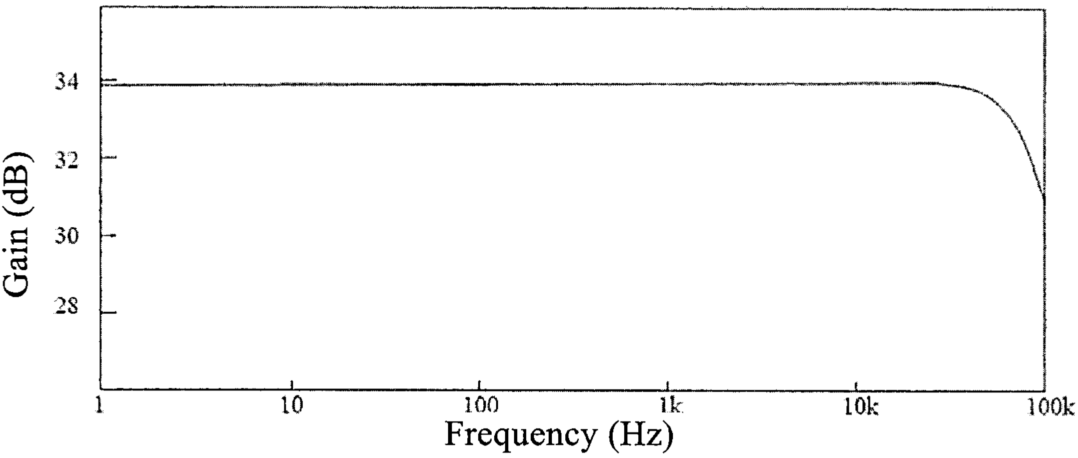
FIG. 4 is a response spectrum curve of an amplifier according to one embodiment of the present disclosure.

FIG. 4 is a response spectrum curve of the amplifier according to one embodiment of the present disclosure.

Figure 5:
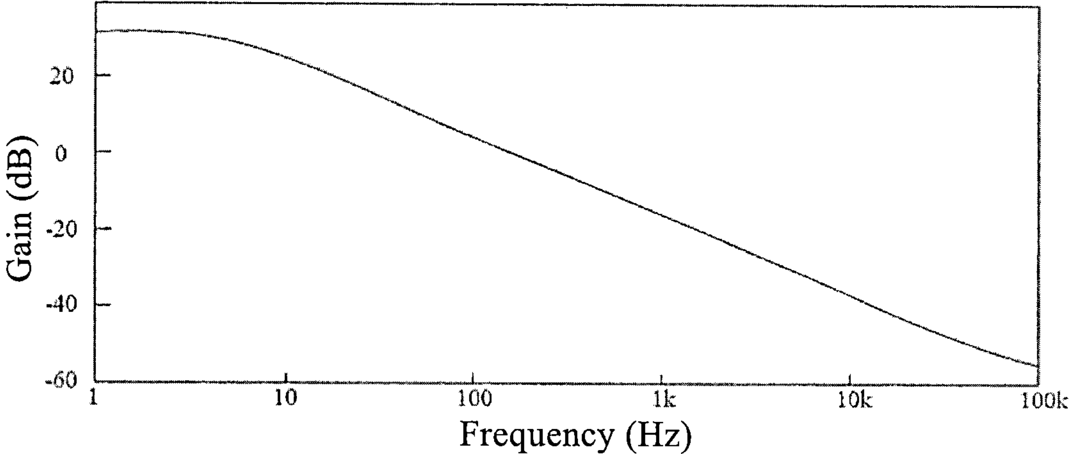
FIG. 5 is a response spectrum curve of an integration module according to one embodiment of the present disclosure.

FIG. 5 is a response spectrum curve of the integration module according to one embodiment of the present disclosure.

Figure 6:
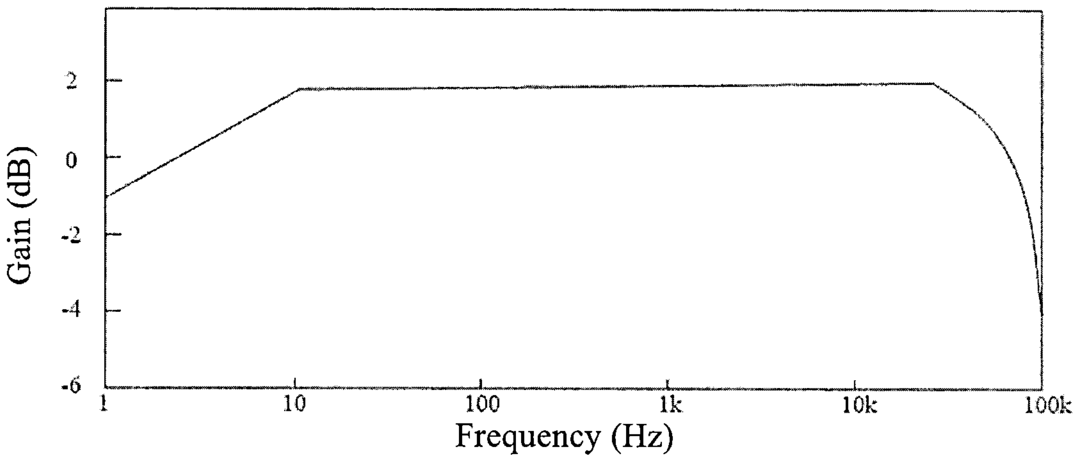
FIG. 6 is a response spectrum curve of an electric field sensor according to one embodiment of the present disclosure.

FIG. 6 is a response spectrum curve of the electric field sensor according to one embodiment of the present disclosure.

As shown in FIGS. 2-6, the electric field sensor is composed of the sensing unit and the readout unit shown in FIG. 2, where the readout unit is composed of a differential amplifier and an integration module connected in series. An overall response function of the electric field sensor is the product of a response function of the sensing unit, a response function of the differential amplifier and a response function of the integrator. The specific response spectra of various portions are shown in FIGS. 3-6. After a capacitor and the sensing unit pass through the differential amplifier and the integrator, the overall response curve of the sensor shows a response pattern of a band-pass filter, and the middle with ten Hz to tens of thousands Hz shows a flat region, which is conductive to an increase of sensitivity of this frequency band and a dynamic range of the electric field sensor. FIG. 7 shows curves of electric field response data and magnetic field response data measured by the apparent resistivity measuring system using a semi-airborne electromagnetic method according to one embodiment of the present disclosure.

Figure 7A:
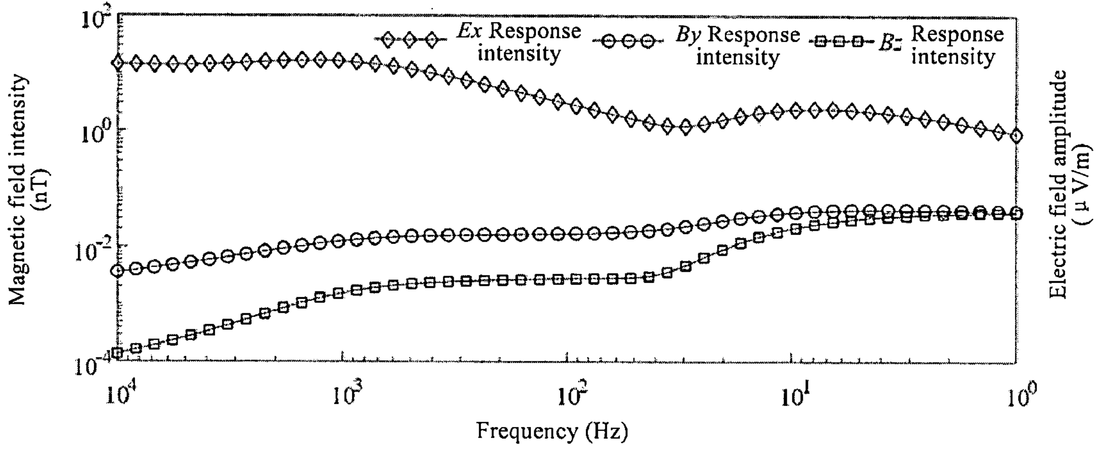
FIGS. 7A-B shows curves of electric field response data and magnetic field response data measured by means of an apparent resistivity measuring system using a semi-airborne electromagnetic method according to one embodiment of the present disclosure.
Figure 7B:
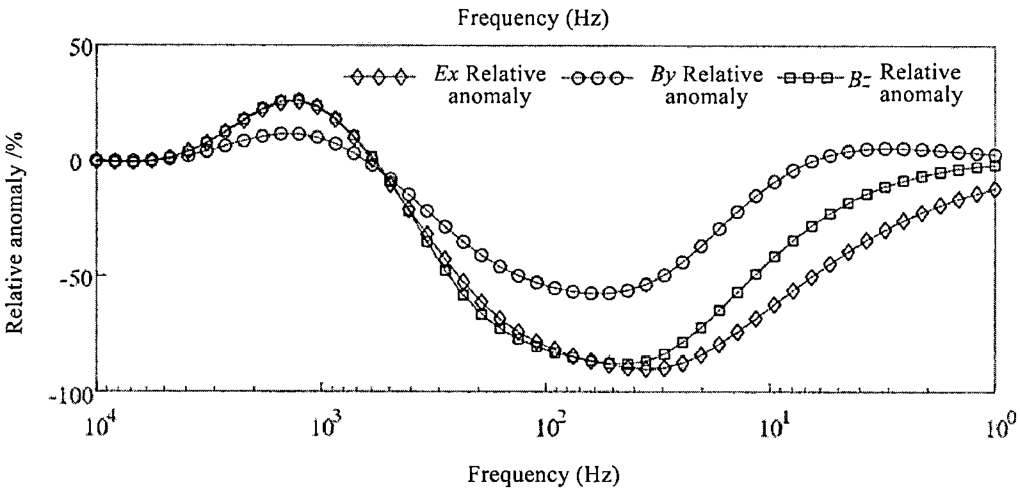

FIG. 7A shows a response amplitude, and FIG. 7B shows relative anomalies, namely relative errors between a response amplitude of an electrical structure with a low resistivity layer and a response amplitude of a homogeneous structure.

As can be seen from FIG. 7A, the electric field response amplitude in the x direction is at the level of 1-100 μV/m, and the magnetic field response is at the level of 0.1 pT-0.1 nT. Referring to sensitivity of conventional electric field and magnetic field sensors, the electric field response amplitude is much greater than the magnetic field response, which is easier to detect, and compared with the z component, the y-component magnetic field response amplitude is greater, which is easier to detect. Under the same conditions, signal-to-noise ratios of the x-direction electric field response data and the y-direction magnetic field response data are higher, and measurement accuracy is higher. As can be seen from the sub-figure of FIG. 7B, for a low-resistivity target layer in this calculation example, the electric field and magnetic field responses show negative relative anomalies in the frequency band of several Hz to 1 kHz, and an amplitude of the x-direction electric field response is greater than that of an absolute value of the anomaly, and a frequency width corresponding to the negative anomaly is wider, indicating that the electric field in the x direction is most sensitive to the low-resistivity target layer, followed by the magnetic field in the z direction and the magnetic field in the y direction. All the above results show the necessity of electric field measurement in the x direction.

FIG. 8 shows an electric field apparent resistivity curve and a tipper curve of the apparent resistivity measuring system using a semi-airborne electromagnetic method according to one embodiment of the present disclosure.

Figure 8A:
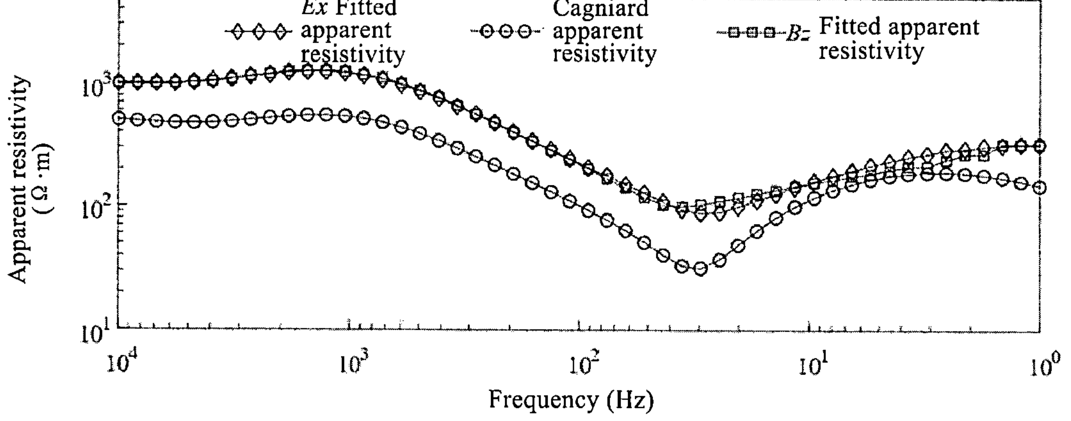
FIGS. 8A-B shows an electric field apparent resistivity curve and a tipper curve of an apparent resistivity measuring system using a semi-airborne electromagnetic method according to one embodiment of the present disclosure.
Figure 8B:
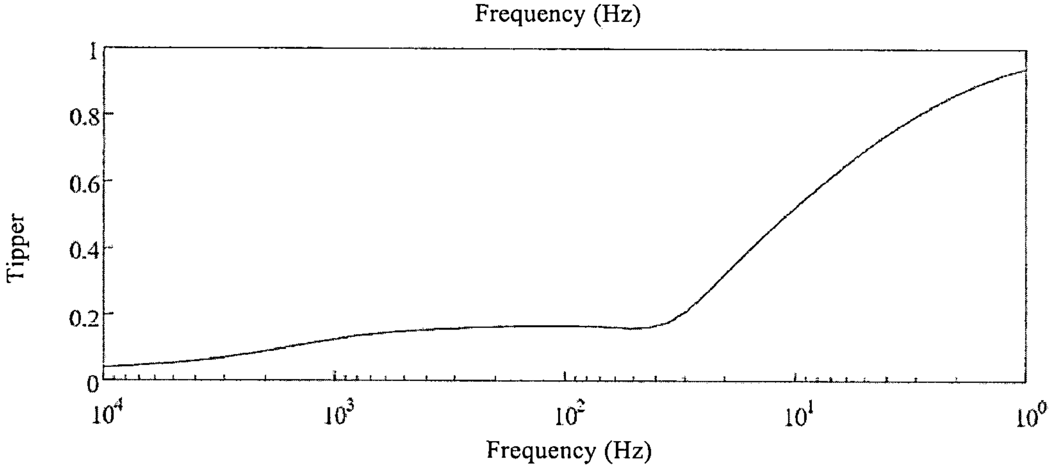

FIG. 8A shows the apparent resistivity curve, and FIG. 8B shows the tipper curve.

In FIG. 8A, fitted apparent resistivity of the electric field in the x direction, fitted apparent resistivity fitted of the magnetic field in the z direction, and Cagniard apparent resistivity are compared. It can be seen that the response of the low-resistivity target layer shows a concave in a certain frequency band in three kinds of apparent resistivity curves, among which the concave of the Cagniard apparent resistivity curve is the most obvious, the trend of both electric and magnetic field fitted apparent resistivity is basically the same, and the concave situation is slightly lower than that of Cagniard apparent resistivity, that is, Cagniard apparent resistivity responds more obviously to the low-resistivity target layer. FIG. 8B is the tipper curve. The low-resistivity target layer also shows an anomaly in a response frequency band, which can be used as an electrical constraint condition for inversion interpretation of semi-airborne electromagnetic detection data.

By combining conclusions of FIG. 7 and FIG. 8, and considering that the magnetic field is more susceptible to environmental interference, it is found that it is very important to introduce electric field measurement in semi-airborne electromagnetic detection, such that higher quality electric field data can be used for improving detection accuracy, and moreover, introduction of Cagniard resistivity and tippers can further restrict inversion accuracy of field fitted apparent resistivity.

In another example of the present disclosure, an apparent resistivity measuring method using a semi-airborne electromagnetic method is provided, and measurement is performed by using the measuring system according to any one of the above technical solutions.

Figure 9:
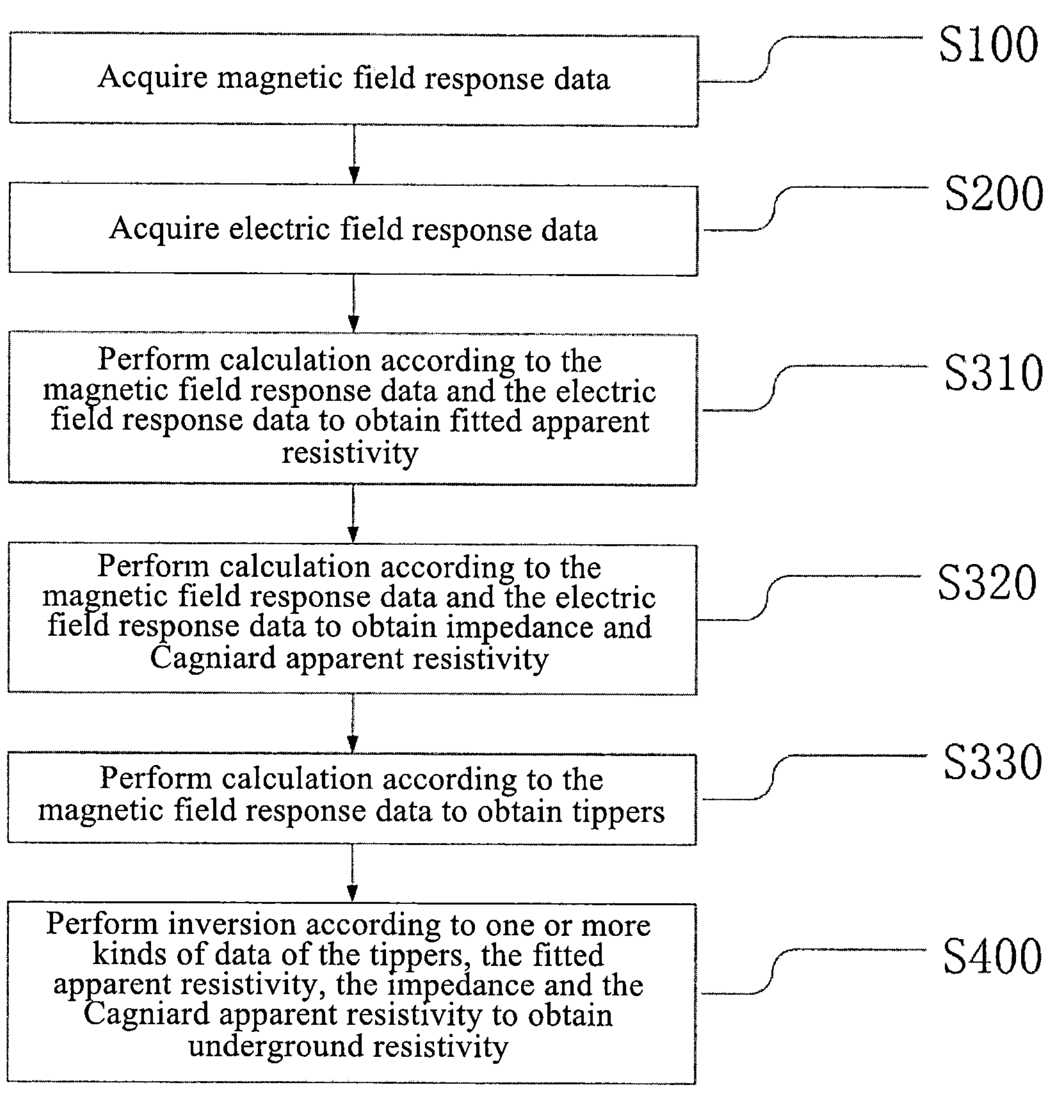
FIG. 9 is a flow diagram of an apparent resistivity measuring method using a semi-airborne electromagnetic method according to one embodiment of the present disclosure.

FIG. 9 is a flow diagram of the apparent resistivity measuring method using a semi-airborne electromagnetic method according to one embodiment of the present disclosure.

As shown in FIG. 9, in an optional example, the apparent resistivity measuring method using a semi-airborne electromagnetic method at least includes the following steps:

S100, acquire magnetic field response data.

S200, acquire electric field response data.

S310, perform calculation according to the magnetic field response data and the electric field response data to obtain fitted apparent resistivity.

S320, perform calculation according to the magnetic field response data and the electric field response data to obtain impedance and Cagniard apparent resistivity.

S330, perform calculation to obtain tippers according to the magnetic field response data.

S400, perform inversion according to one or more kinds of data of the tippers, the fitted apparent resistivity, the impedance and the Cagniard apparent resistivity to obtain underground resistivity.

In an optional example, the magnetic field response data and the electric field response data are acquired at the same moment.

In an optional example, the method for measuring apparent resistivity by using a semi-airborne electromagnetic method may further include the following steps:

S110, acquire the three-component magnetic field response data.

S210, acquire the two-component electric field response data.

S311, calculate fitted apparent resistivity on the basis of horizontal electric field response data of a single x direction and magnetic field response data of a single vertical component.

S321, calculate impedance and Cagniard apparent resistivity in both x and y directions on the basis of the electric field response data in a horizontal direction and the magnetic field response data in the horizontal direction.

S331, calculate tippers on the basis of the magnetic field response data utilizing three components.

S410, perform inversion according to one or more kinds of data of the tippers, the fitted apparent resistivity, the impedance and the Cagniard apparent resistivity to obtain underground resistivity.

In an optional example, the method for measuring apparent resistivity by using a semi-airborne electromagnetic method may include: acquire magnetic field response data; acquire electric field response data; and perform calculation to obtain tippers according to the magnetic field response data, perform calculation to obtain impedance, Cagniard apparent resistivity and fitted apparent resistivity according to the magnetic field response data and the electric field response data, and perform inversion according to one or more kinds of data of the tippers, the fitted apparent resistivity, the impedance and the Cagniard apparent resistivity to obtain underground resistivity.

In an optional example, the apparent resistivity measuring method using a semi-airborne electromagnetic method may include: acquire the three-component magnetic field response data; acquire the two-component electric field response data; calculate fitted apparent resistivity on the basis of horizontal electric field response data of a single x direction and magnetic field response data of a single vertical component; calculate impedance and Cagniard apparent resistivity in both x and y directions on the basis of the electric field response data in a horizontal direction and the magnetic field response data in the horizontal direction; calculate tippers on the basis of the magnetic field response data utilizing three components; and perform inversion according to one or more kinds of data of the tippers, the fitted apparent resistivity, the impedance and the Cagniard apparent resistivity to obtain underground resistivity.

The present disclosure is intended to protect an apparent resistivity measuring system and method using a semi-airborne electromagnetic method. The apparent resistivity measuring system using a semi-airborne electromagnetic method may include: a magnetic field sensor for acquiring magnetic field response data; an electric field sensor for acquiring electric field response data; and a processor, where the magnetic field sensor and the electric field sensor each are connected to the processor, and the processor is configured to perform calculation to obtain tippers according to the magnetic field response data, perform calculation to obtain impedance, Cagniard apparent resistivity and fitted apparent resistivity according to the magnetic field response data and the electric field response data, and perform inversion according to one or more kinds of data of the tippers, the fitted apparent resistivity, the impedance and the Cagniard apparent resistivity to obtain underground resistivity. According to the apparent resistivity measuring system using a semi-airborne electromagnetic method, an electric field is introduced, influence of a transmitting field source is eliminated by means of a ratio of an electromagnetic field, and interpretation accuracy is improved. Systemically, a signal-to-noise ratio of the system is improved by measuring electric field and magnetic field signals in the horizontal direction which are stronger and slow in attenuation along with a transmitter-to-receiver distance, such that a detection range can be effectively expanded, and a detection depth can be effectively increased.

It should be understood that the above specific embodiments are merely used for illustratively describing or explaining the principle of the present disclosure or are not intended to limit the present disclosure. Therefore, any modifications, equivalent replacements, improvements, etc. made without deviating from the spirit and principles of the present disclosure should be included within the protection scope of the present disclosure. Additionally, the appended claims of the present disclosure are intended to cover all changes and modifications that fall within the scope and boundaries of the appended claims, or equivalents of such a scope and boundaries.

The invention claimed is:

1. An apparent resistivity measuring system using a semi-airborne electromagnetic method, comprising:

a magnetic field sensor for acquiring magnetic field response data;

an electric field sensor for acquiring electric field response data; wherein the electric field sensor comprises: a sensing unit comprising two capacitance modules symmetrically distributed and having the same size, wherein capacitance is calculated by measuring voltages of the two capacitance modules, and the electric field response data is calculated and obtained by means of the capacitance; and a readout unit comprising an integration module and an amplifier, wherein the integration module is configured to condition a frequency response curve of the electric field sensor into a flat straight line;

a processor, wherein the magnetic field sensor and the electric field sensor each are connected to the processor, and the processor is configured to perform calculation to obtain tippers according to the magnetic field response data, perform calculation to obtain impedance, Cagniard apparent resistivity and fitted apparent resistivity according to the magnetic field response data and the electric field response data, and perform inversion according to one or more kinds of data of the tippers, the fitted apparent resistivity, the impedance and the Cagniard apparent resistivity to obtain underground resistivity;

wherein the magnetic field response data is three-component magnetic field response data, and the electric field response data is two-component electric field response data;

the processor calculates fitted apparent resistivity on the basis of the horizontal electric field response data of a single x direction and the magnetic field response data of a single vertical component;

the processor calculates impedance and Cagniard apparent resistivity in x and y directions on the basis of the electric field response data in a horizontal direction and the magnetic field response data in the horizontal direction; and the processor calculates tippers on the basis of the magnetic field response data utilizing three components.

2. The apparent resistivity measuring system using a semi-airborne electromagnetic method according to claim 1, wherein the electric field sensor further comprises:

a gyroscope for detecting an attitude deflection angle of the electric field sensor.

3. The apparent resistivity measuring system using a semi-airborne electromagnetic method according to claim 1, wherein the electric field sensor is arranged outside an annulus of a receiving coil.

4. The apparent resistivity measuring system using a semi-airborne electromagnetic method according to any one of claim 1, wherein the electric field sensor is a spherical capacitive electric field sensor or a box type capacitive electric field sensor.

5. An apparent resistivity measuring method using a semi-airborne electromagnetic method, wherein measurement is performed by using the measuring system according to any one of claim 1.

6. The apparent resistivity measuring method using a semi-airborne electromagnetic method according to claim 5, comprising acquiring magnetic field response data;

acquiring electric field response data; and performing calculation to obtain tippers according to the magnetic field response data, performing calculation to obtain impedance, Cagniard apparent resistivity and fitted apparent resistivity according to the magnetic field response data and the electric field response data, and performing inversion according to one or more kinds of data of the tippers, the fitted apparent resistivity, the impedance and the Cagniard apparent resistivity to obtain underground resistivity.

7. The apparent resistivity measuring method using a semi-airborne electromagnetic method according to claim 6, comprising acquiring the three-component magnetic field response data;

acquiring the two-component electric field response data;

calculating fitted apparent resistivity on the basis of horizontal electric field response data of a single x direction and magnetic field response data of a single vertical component;

calculating impedance and Cagniard apparent resistivity in both x and y directions on the basis of the electric field response data in a horizontal direction and the magnetic field response data in the horizontal direction;

calculating tippers on the basis of the magnetic field response data utilizing three components; and performing inversion according to one or more kinds of data of the tippers, the fitted apparent resistivity, the impedance and the Cagniard apparent resistivity to obtain underground resistivity.

8. The apparent resistivity measuring system using a semi-airborne electromagnetic method according to claim 2, wherein the electric field sensor is a spherical capacitive electric field sensor or a box type capacitive electric field sensor.

9. The apparent resistivity measuring system using a semi-airborne electromagnetic method according to claim 3, wherein the electric field sensor is a spherical capacitive electric field sensor or a box type capacitive electric field sensor.

10. An apparent resistivity measuring method using a semi-airborne electromagnetic method, wherein measurement is performed by using the measuring system according to claim 2.

11. An apparent resistivity measuring method using a semi-airborne electromagnetic method, wherein measurement is performed by using the measuring system according to claim 3.

* * * * *